United States Patent

[11] 3,557,950

| [72] | Inventor | Whitney Powers<br>Pine City, N.Y. |
|---|---|---|
| [21] | Appl. No. | 762,070 |
| [22] | Filed | Sept. 24, 1968 |
| [45] | Patented | Jan. 26, 1971 |
| [73] | Assignee | Powers Manufacturing Inc.<br>Emyra, N.Y.<br>a corporation of New York |

[54] PHOTO-ELECTRIC CRACK DETECTOR FOR GLASS BOTTLES
11 Claims, 8 Drawing Figs.

[52] U.S. Cl. ................................................. 209/111.7,
250/223; 356/240
[51] Int. Cl. ................................................. B07c 5/342
[50] Field of Search ........................................... 209/73, 74,
75, 111.6, 111.7; 250/223, 223B, 224; 356/240

[56] References Cited
UNITED STATES PATENTS

| 2,331,277 | 10/1943 | Stout | 209/111.7 |
| 3,101,848 | 8/1963 | Uhlig | 209/111.7X |
| 3,191,773 | 6/1965 | Wyman | 209/111.7 |
| 3,411,009 | 11/1968 | Ford | 209/111.7X |
| 3,220,250 | 11/1965 | Strandquist | 250/224X |

*Primary Examiner*—Richard A. Schacher
*Attorney*—Seidel and Gonda

ABSTRACT: Apparatus for photoelectrically detecting cracks or flaws in the bottoms, necks, or lips of glass bottles while being rotated and traversed in single line through a test path, storing the effect of a signal resulting from the presence of such a defect, and utilizing said stored effect to cause ejection of defective bottles after they pass beyond the test area.

PATENTED JAN 26 1971

INVENTOR
WHITNEY POWERS

BY Seidel & Gonda
ATTORNEYS.

INVENTOR
WHITNEY POWERS
BY
Seidel & Gonda
ATTORNEYS.

FIG.4
FIG.5
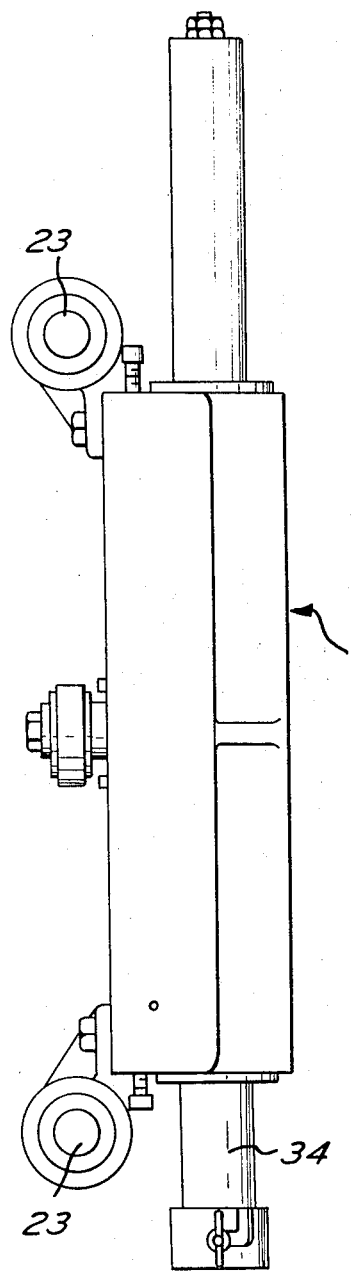
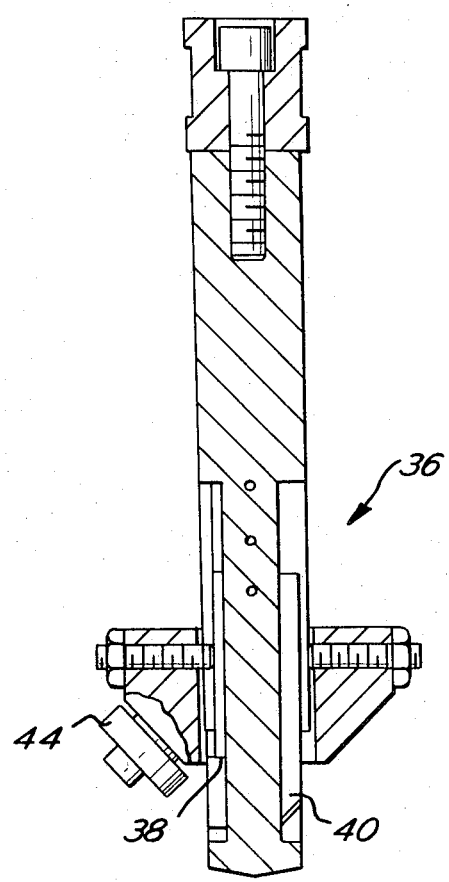
INVENTOR
WHITNEY .POWERS
BY
Seidel & Gonda
ATTORNEYS.

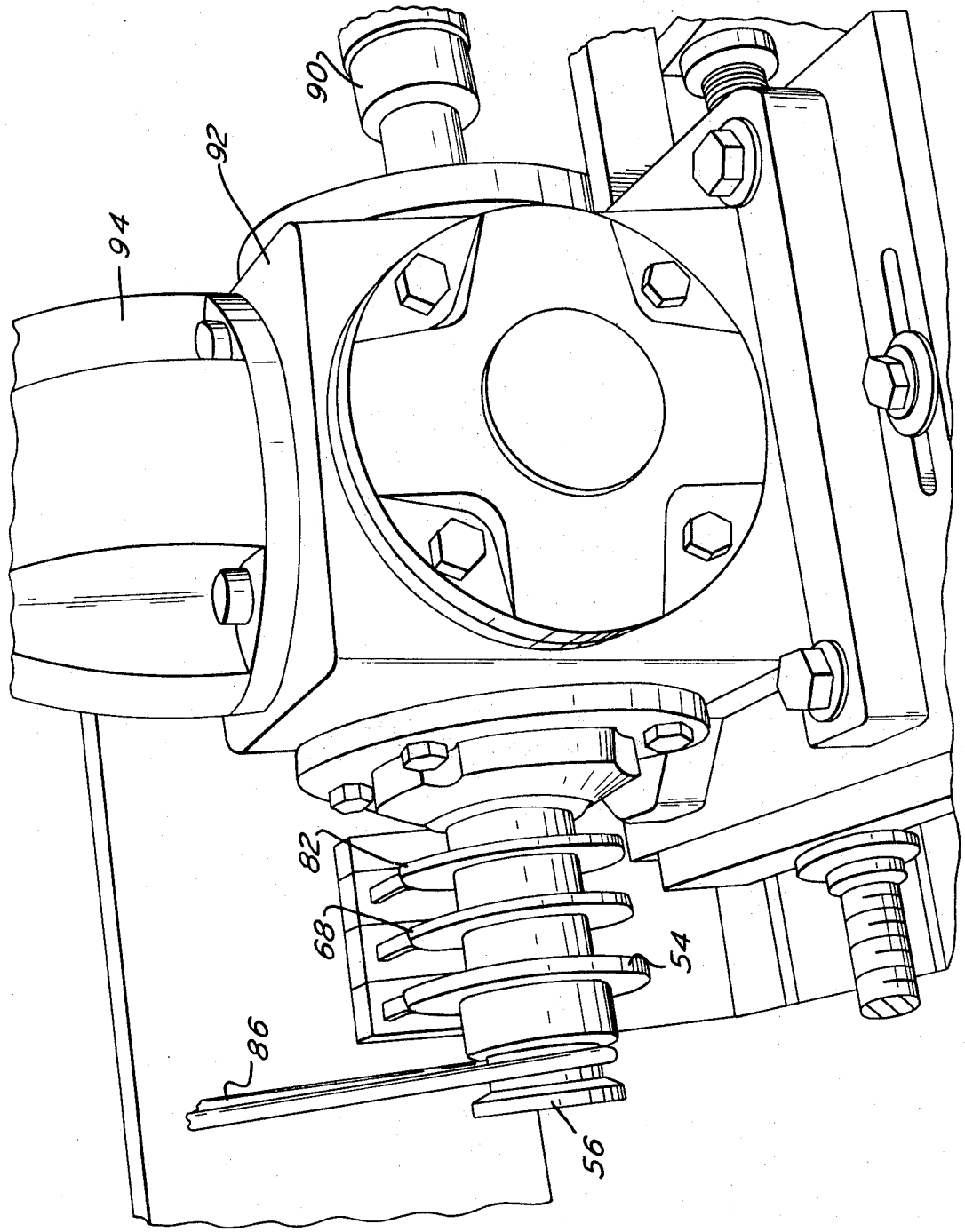

PHOTO-ELECTRIC CRACK DETECTOR FOR GLASS BOTTLES

The principle cause of loss in manufacture of glass containers is the presence of cracks or checks caused usually by thermal and/or mechanical stresses. These imperfections occur generally in one or more of three locations.

A. At the extreme top of the bottle where the checks are primarily radial and vertical, called splits, and may cause leakage past the closure cap.

B. Directly underneath that portion of the bottle where the closure is attached, called underring checks, and may cause rupture of the neck of the bottle when force is applied to remove the cap, or product loss due to leakage.

C. In the bearing surface at the bottom of the bottle, called base contact checks, which may cause rupture of the bottle from internal pressure, or thermal shock during filling.

Many inspection devices have been suggested heretofore. For example, see U.S. Pat. No. 2,902,151. The problem with prior devices is that they are not fast enough to keep up with the speed at which bottles are made. Thus, the bottles have their linear movement interrupted during inspection in the system disclosed in said patent. In the present invention, the bottles continuously move along a path which may be designated a test area. At the same time, the bottles rotate about their longitudinal axes while moving through the test area. In order that the bottles may be optically inspected when passing through the test area, the optical system is supported by a pair of carriages arranged for synchronized reciprocatory movement with respect to the bottles.

It is an object of the present invention to provide a device for inspecting and rejecting glass containers without stopping the linear movement of the containers.

It is an object of the present invention to provide a device for inspecting bottles for defects of the above character, while in continuous linear and rotary motion, at speeds in the range of 180 bottles per minute.

It is another object to provide such a device in which the critical areas of the bottles are illuminated by light beams, and photoelectric sensors, traveling with the bottles, are activated by light of a predetermined level reflected from cracks or flaws in the bottles to produce signals which cause defective bottles to be ejected from the line.

It is another object to provide such a device in which the photoelectric sensors are brought into close proximity to the critical areas of the bottles during the inspection operation whereby light flashes reflected from cracks or flaws at random, widely divergent angles as the bottles are rotated, are seen by and actuate the sensors.

Further objects and advantages will be apparent from the following description, in conjunction with the accompanying drawing in which:

FIG. 4 is a detail of the second carriage and vertically movable plunger for inserting the sensors in the neck of the bottles.

FIG. 5 is a sectional detail of the test fixture with the sensors located therein.

FIG. 7 is an enlarged detail of the microswitches controlling the electrical circuits, and the cams for their timed actuation.

Figure 1:
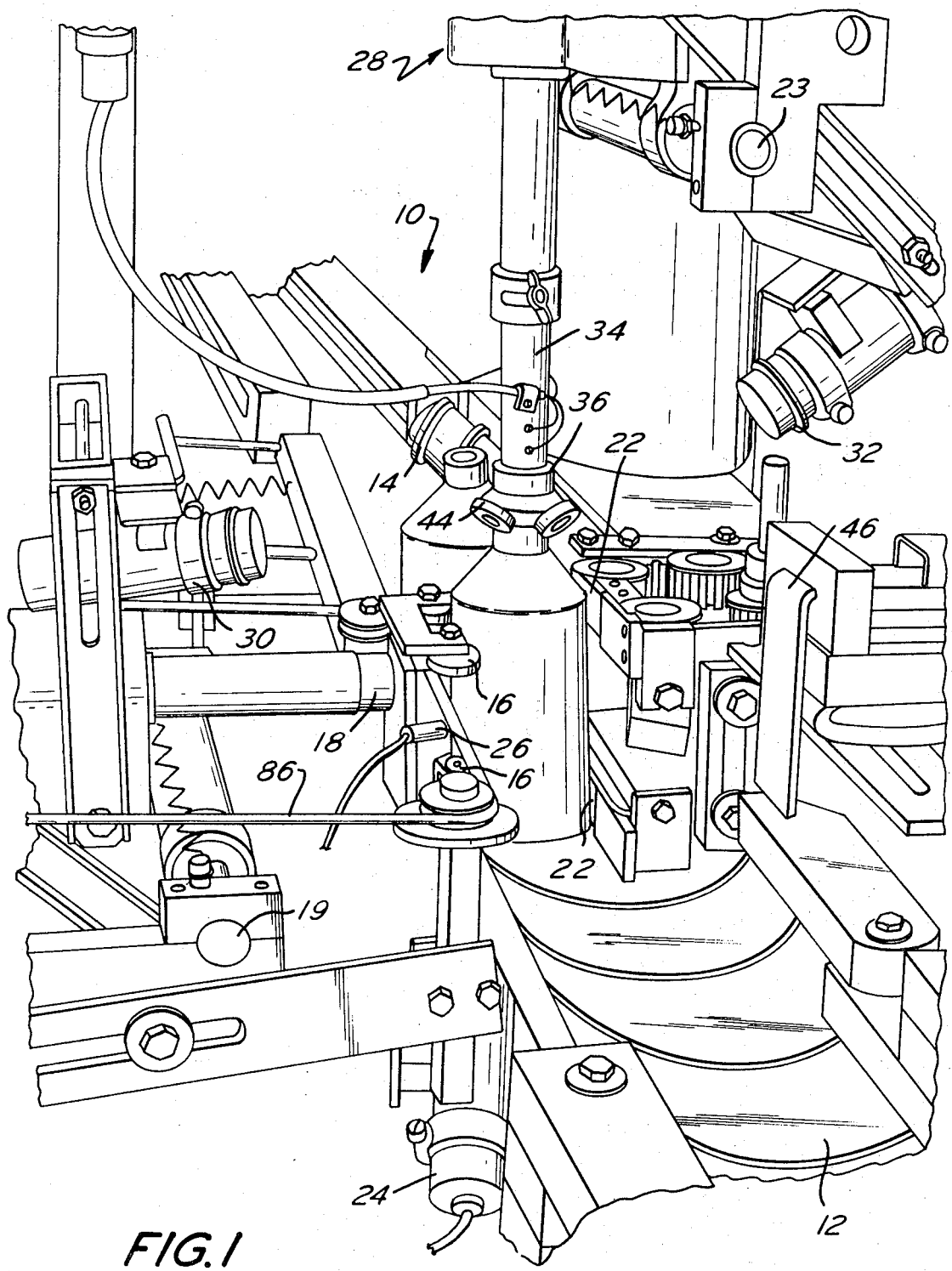
FIG. 1 is a general perspective view of the device.

As shown in FIG. 1 of the drawing the bottles to be inspected are brought to the inspection device designated generally as 10 on a linear conveyor 12 of conventional construction. The bottles are spaced and sequentially moved into the test area by a feed screw 14.

Figure 2:
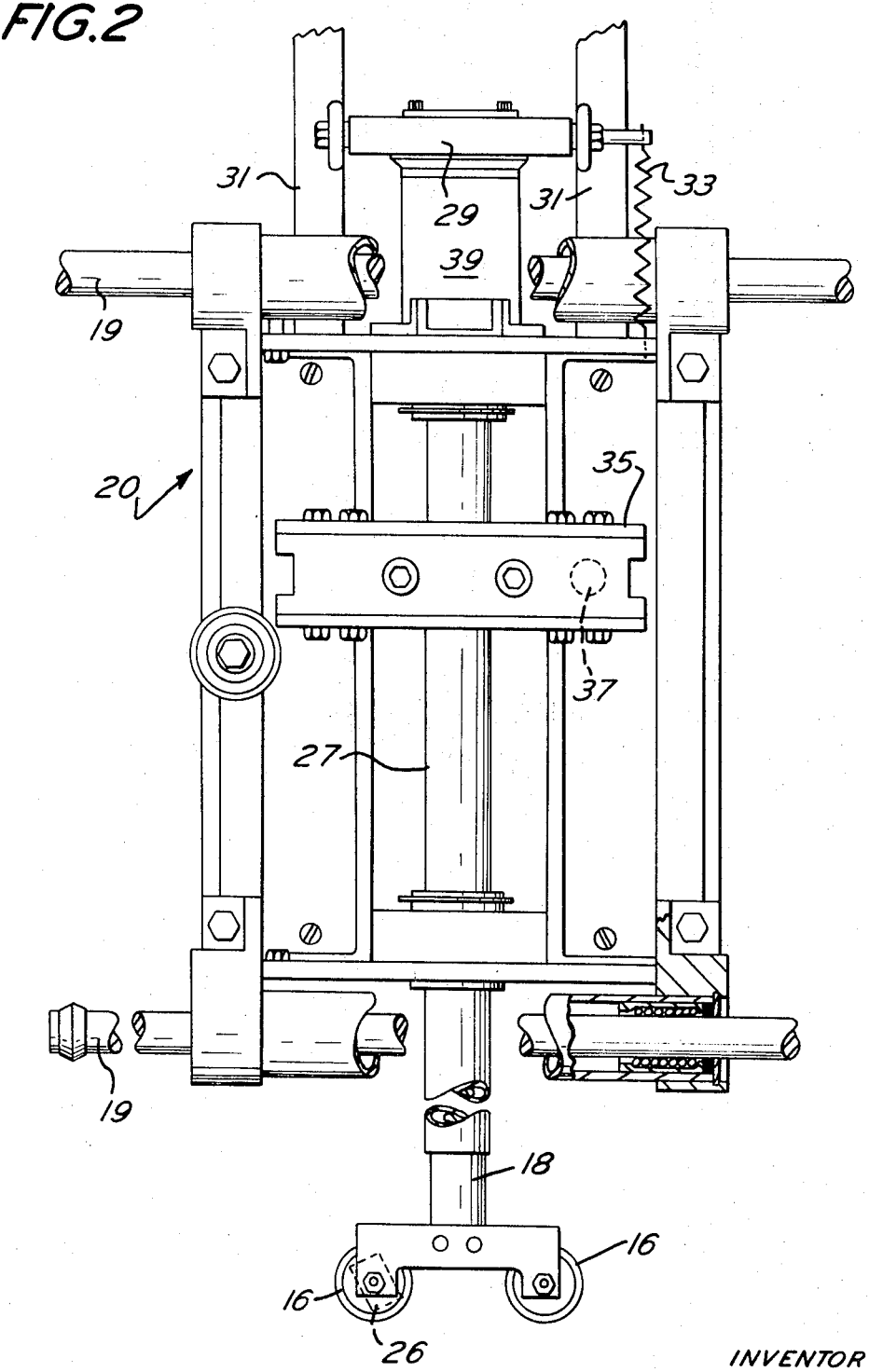
FIG. 2 is a detail of the horizontally movable carriage and bottle-engaging plunger.
Figure 3:
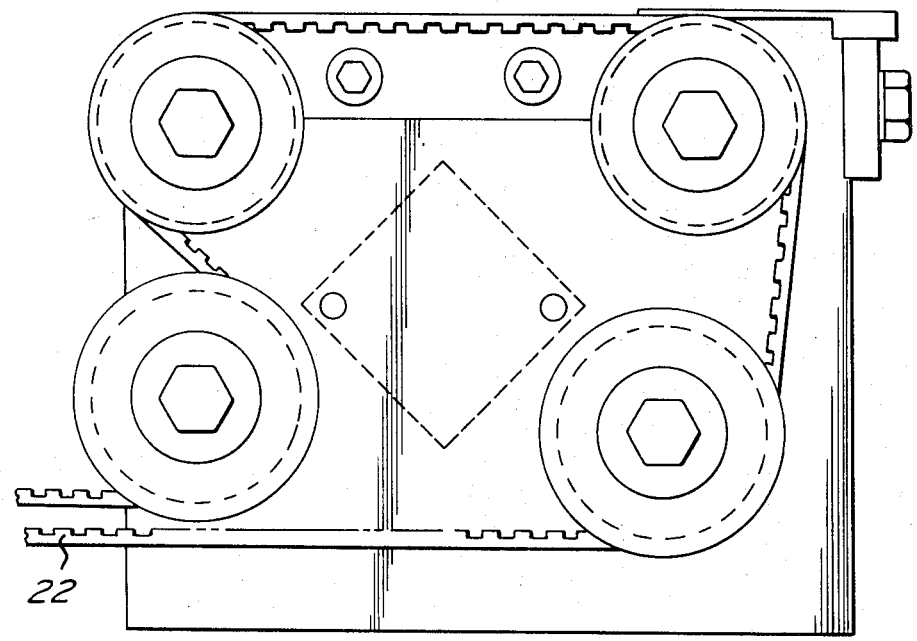
FIG. 3 is a detail of the belt drive for rotating the bottles as they are being inspected.

As the bottle enters the test area, it is engaged by two pairs of spaced rollers 16 on a horizontal plunger or thrust member 18 mounted on a horizontally movable carriage 20 (FIG. 2). Carriage 20 is mounted for movement along the axes of shafts 19. While only one pair of rollers 16 would be adequate with a particular bottle size, use of two pairs of rollers disposed one above the other makes the unit universal for use with almost all bottles.

The rollers 16 grasp the bottle to move it with the carriage 20, and press the bottle against a pair of horizontally moving endless belts 22. Belts 22 are disposed one above the other and rotate the bottle 360° as it passes through the test area. The belts 22 move in a direction opposite to the direction of conveyor 12.

A light source 24 is mounted beneath the carriage 20 in a position to direct a light beam on the bottom of each bottle. A photoelectric sensor 26 is fixed on the plunger 18 in a position to detect reflections or dispersions from the beam caused by cracks, or checks in the bearing surface, at the bottom of the bottle. Light source 24 and sensor 26 may be referred to as an optical sensing means for detecting defects in a container.

A second light source 30 is mounted on the first carriage 20 in position to direct its beam on the top area of the bottle where the closure is to be attached. A second carriage 28 is mounted above the bottle test area and moved horizontally in synchronism with the first carriage 20 along the axis of shafts 23. A third light source 32 is mounted on the second carriage 28 in position to direct its beam on the neck of the bottle, underneath that zone where the closure is to be attached.

A plunger 34 mounted for vertical movement on the second carriage 28 has on its lower end a test fixture 36 (FIG. 5) adapted to enter the neck of the bottle. A second sensor 38 is positioned to detect light reflected from the beam of the second light source 30 by cracks or checks in the area so illuminated. The test fixture 36 also embodies a third sensor 40 positioned to detect light deflected by cracks or checks in the portion of the bottle illuminated by the third light source 32. Sensors 38 and 40 are supported on opposite sides of plunger 34 and are less likely to be affected by stray reflections due to the fact that they are located in the bottle during inspection.

Both carriages 20 and 28 are moved in synchronism through the test area at constant speed in the direction of travel of the conveyor 12, and return at a substantially sinusoidal rate after completion of the inspection and release of the bottle.

Since the mechanism for reciprocating the carriages 20 and 28 in timed relation with the screw 14 is the same as the means for reciprocating the carriage which is illustrated and described in my U.S. Pat. No. 3,387,704, and per se forms no part of the present invention, further description thereof is deemed unnecessary. The disclosure in said patent is incorporated herein by reference. Each of the plungers 18 and 34 are cammed toward and into contact with a bottle at the beginning of the stroke of their carriages and are biased away from the bottle at the end of the carriage strokes.

Plunger 18 is guided for reciprocatory movement by sleeve 27 on carriage 20. Plunger 18 is connected to a head plate 29 having wheels rolling on tracks 31. Collar 39 is a limit stop for plate 29 when there is no bottle being inspected. Plunger 18 is biased toward the conveyor 12 by spring 33 (only one shown) and is reciprocated by crank roller 37 cooperating with Scotch yoke 35. Crank roller 37 is mounted on a shaft which is generally perpendicular to plunger 18. The lateral and reciprocatory movement is generated using two mechanisms, one horizontal and one vertical, essentially as disclosed in my U.S. Pat. No. 3,387,704.

The vertical plunger 34 is timed to enter the bottle shortly after the horizontal plunger 18 has grasped it, and to withdraw shortly before the horizontal plunger 18 releases the bottle.

Three rollers 44 (FIGS. 1 and 5) are mounted near the lower end of the vertical plunger 34 in position to bear on the top of the bottle and thereby define the position of the test fixture in the bottle being inspected. Rollers 44 are positioned so as not to interfere with the ability of sensors 38 and 40 to perform their intended function.

The plungers 18 and 34 are yieldingly telescopic to ensure that the rollers 16 and 44 are firmly pressed against the bottle while the inspection is taking place. The speed of the belts 22 is so regulated as to insure a complete rotation of the bottle during this time interval.

The system for ejecting defective bottles comprises an electromagnetically actuated ejector paddle 46 (FIG. 1) located beside the conveyor beyond the test area, and circuitry for actuating the paddle 46 when a defective bottle comes opposite the paddle.

Figure 6:
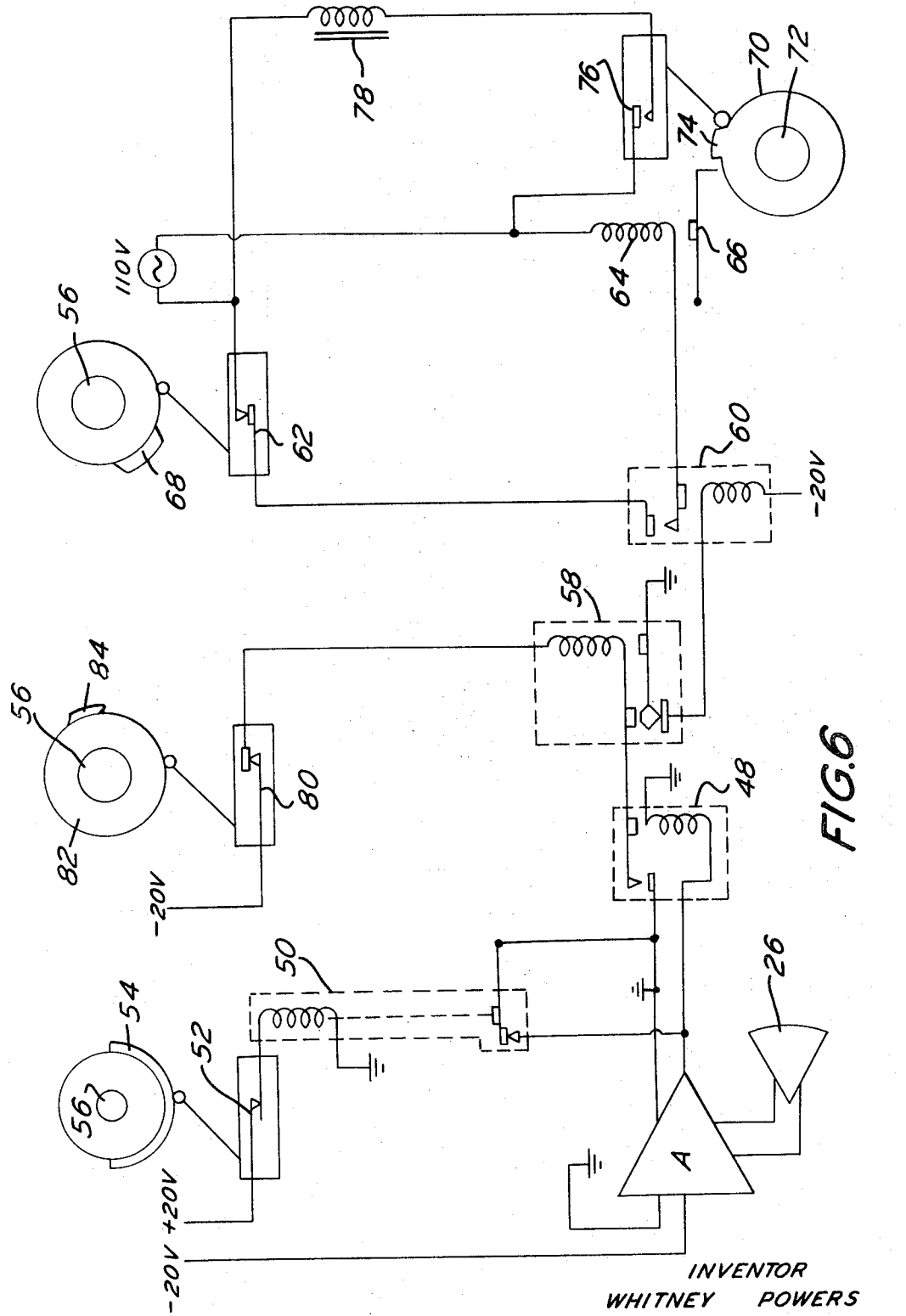
FIG. 6 is a schematic diagram of the electrical system.

FIG. 6 illustrates diagrammatically the circuitry for causing actuation of the ejector paddle 46 responsive to a signal, from any one of the three sensors 26, 38 and 40, caused by a flash of light reflected from a crack or check in a bottle being inspected.

As shown in FIG. 6, the output of the sensor 26 is amplified and caused to actuate a signal relay 48. The amplified signal is normally grounded. However, when relay 50 is energized by closure of a microswitch 52 by a sensor-arming cam 54 (FIG. 7) fixed in suitably timed relation on the shaft 56 which actuates the horizontal carriage 20, relay 48 is actuated.

Actuation of relay 48 by a signal impulse causes actuation of a holding relay 58 which thereby deenergizes a memory relay 60, allowing its contacts to close, and at the same time completes a holding circuit which keeps the holding relay 58 energized. The contacts of the memory relay 60 are located in an interrogate circuit in series with a normally open interrogate microswitch 62, and the solenoid 64 of a memory cam latch 66. An interrogate cam 68 (FIG. 7) is fixedly mounted on the shaft 56 in position to close the interrogate switch 62 immediately after the completion of the inspection of the bottle by the sensors.

A memory cam 70 is frictionally mounted on the shaft 72 which actuates the second carriage 28, and is normally prevented from rotation with the shaft by the latch 66. A lobe 74 on the memory cam 70 is arranged, after a predetermined rotation of the cam, to engage and close a normally open reject microswitch 76, thereby completing a circuit through the coil 78 which actuates the ejector paddle 46.

The holding circuit for the holding relay 58 includes a normally closed microswitch 80. A reset cam 82 (FIG. 7) is fixed on shaft 56 in position for its lobe 84 to engage and open the switch 80 shortly after the actuation of the interrogate switch 62.

Figure 8:
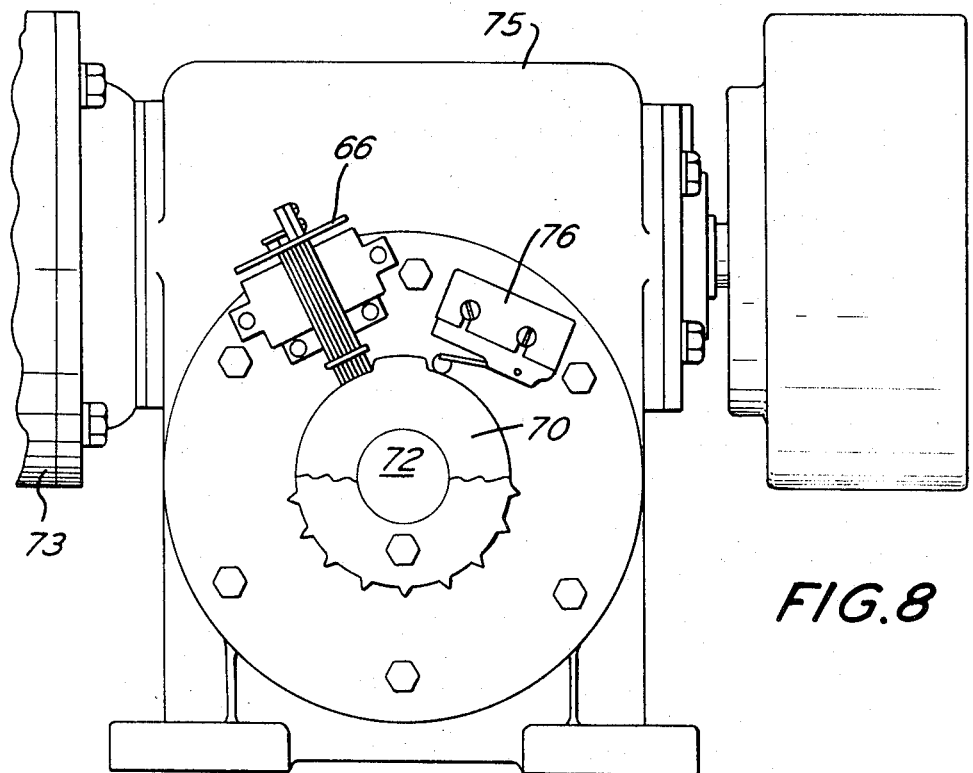
FIG. 8 is a detail of the memory cam with its retaining latch and the eject microswitch actuated thereby.

The motor 73 for reciprocating carriages 20 and 28 is mounted on worm gear box 75 (FIG. 8). A sprocket on shaft 72 drives a second sprocket on shaft 90 which drives right angle gear box 92. See FIG. 7. Casing 94 supports the traversing and reciprocating cam as disclosed in my U.S. Pat. No. 3,387,704.

In operation, the bottles to be inspected are brought in single line to the test area at the rate of about three per second by conveyor 12. The bottles are seized one at a time by the horizontal plunger 18 and traversed through the test area while being pressed against and rotated by the backwardly moving belts 22. Simultaneously therewith, the vertical plunger 34 lowers the test fixture 36 into the neck of the bottle, and the sensor arming cam 54 opens the disabling circuit so that the sensors become effective throughout the passage of the bottle through the test area.

If none of the sensors see a reflection of light from a crack or flaw in the bottle, the signal relay 48 is not actuated, and the memory relay 60 holds it contacts open. Closure of the interrogate switch 62 by the interrogate cam 68 at the termination of the inspection is therefore ineffective to close the interrogate circuit, and the bottle is released by withdrawal of the plungers 18 and 34 and allowed to continue on the conveyor 12 with the assistance of the belt 82 (FIG. 1) which constitutes a moving guide rail for the bottle.

If, however, any of the sensors see a flash of light from the rotating bottle, the consequent electrical impulse, after amplification, causes closure of the signal relay 48. The sensors 26, 38 and 40 constantly monitor the light level coming from the bottle and can be set to activate relay 48 whenever the light level is above a preset value. Relay 48 energizes the holding relay 58 to break the circuit of the memory relay 60, and keep the holding circuit closed. The contacts of the memory relay 60 are thereby allowed to close.

After the bottle has completed its rotation and passage through the inspection area, the interrogate cam 68 closes the interrogate switch 62, and since the contacts of the memory relay 60 are now closed, this completes the circuit through the coil 64 which withdraws the latch 66 and permits the memory cam 70 to rotate with the shaft 72. When the defective bottle has been conveyed to a position opposite the ejector paddle 46, the rotation of the memory cam 70 causes its lobe 74 to engage and close the ejector microswitch 76, thereby energizing the coil 78 to actuate said paddle 46.

After closure of the interrogate switch 62, the lobe 84 of the reset cam 82 opens the microswitch 80 to break the holding circuit, thereby erasing the stored effect of the signal. The plungers 18 and 34 are withdrawn, and the carriages 20 and 28 return to their starting position in readiness for the next inspection.

Each of the sensors 26, 38 and 40 are positioned so as to be in close proximity of the bottle. By close proximity is meant a distance less than about 1/4 inch. Each of the sensors is comparatively large to insure that light randomly deflected from their respective light beams will be detected.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for optically inspecting glass containers comprising a conveyor for continuously moving containers along a path, a carriage mounted for movement along the path at approximately the speed of said conveyor, means for rotating the containers without interrupting the movement of the containers along the path, optical-sensing means including a photoelectric sensor supported by said carriage for detecting defects in the container, means for ejecting defective containers, circuitry coupled to said ejecting means and said sensing means, said circuitry including means for storing the effect of a signal indicative of a defect in a particular container and for operating said ejecting means when the particular container arrives at the location of the ejecting means, and a thrust member mounted on said carriage for movement toward and away from said path, and rotatable members on said thrust member for engagement with the sidewall of containers as the containers rotate.

2. Apparatus for optically inspecting glass containers comprising a conveyor for continuously moving containers along a path, a carriage mounted for movement along the path at approximately the speed of said conveyor, means for rotating the containers without interrupting the movement of the containers along the path, optical-sensing means including a photoelectric sensor supported by said carriage for detecting defects in the container, means for ejecting defective containers, a second carriage synchronized for movement with said first carriage along said path, a second optical-sensing means including a photoelectric sensor supported by said second carriage, the first sensor being positioned to detect defects in a lower portion of the container, the second sensor being positioned to detect defects in an upper portion of the container, and circuitry coupled to said ejecting means and said sensors, said circuitry including means for storing the effect of a signal indicative of a defect in a particular container and for operating said ejecting means when the particular container arrives at the location of the ejecting means, and said first and second sensors are coupled to said circuitry in parallel.

3. Apparatus in accordance with claim 2, including a plunger for entering containers while the containers are being optically tested and rotating, said plunger being supported by one of said carriages for movement therewith.

4. Apparatus in accordance with claim 3 wherein said second sensor is supported by said plunger in close proximity to the inner wall of the container during the testing operation.

5. Apparatus in accordance with claim 3 including a light source mounted on one of said carriages in position to illuminate the portion of the container inspected by the first sensor, a second light source mounted on one of said carriages in position to illuminate the portion of the container inspected by the second sensor, a third sensor mounted on said plunger in position to inspect an intermediate zone of the container, and a third light source mounted on one of said carriages in position to illuminate said intermediate zone.

6. Apparatus for optically inspecting glass containers comprising a conveyor for continuously moving containers along a path, a carriage mounted for movement along the path at approximately the speed of said conveyor, means for rotating the containers without interrupting the movement of the containers along the path, optical-sensing means including a photoelectric sensor supported by said carriage for detecting defects in the container, means for ejecting defective containers, a thrust member mounted on said carriage for movement toward and away from said path, antifriction means on said thrust member for engaging a container under test to press it into said means for rotating the containers, said photoelectric sensor being mounted on said thrust member in a position so as to be in close proximity to the surface of said container, and circuitry coupled to said ejecting means and said sensor, said circuitry including means for storing the effect of a signal indicative of a defect in a particular container and for operating said ejecting means when the particular container arrives at the location of the ejecting means.

7. Apparatus for optically inspecting glass containers comprising a conveyor for continuously moving containers along a path, a carriage mounted for movement along the path at approximately the speed of said conveyor, means for rotating the containers without interrupting the movement of the containers long the path, optical-sensing means including a photoelectric sensor supported by said carriage for detecting defects in the containers, means for ejecting defective containers, and circuitry coupled to said ejecting means and said sensing means, said circuitry including first means for generating a signal having a value corresponding to no defects in said containers, a normally open circuit including said ejecting means, said circuit including a first normally open switch to complete a portion of said circuit and first relay means having normally open contacts, said ejecting means being operative in response to closing said first switch and said first relay means, means for intermittently closing said first switch and second means responsive to a signal corresponding to defects in said containers, said second means being operative to energize said second relay means to activate said ejecting means when said normally open switch is closed.

8. Apparatus in accordance with claim 7 wherein said second means includes second relay means intermediate said first relay means and said signal-generating means, said second relay means normally completing a second circuit to said first relay means to maintain said contacts open and being responsive to a signal corresponding to a defect in said containers to open said second circuit thereby permitting said first relay means contacts to close.

9. Apparatus in accordance with claim 8 wherein said second means includes a second normally open switch means, said second switch means closing in response to a signal corresponding to defects in said container to thereby interrupt the circuit completed by said relay means.

10. Apparatus as defined in claim 9 wherein said second relay means includes a reset circuit, said reset circuit including a normally closed switch, means for intermittently opening said switch so that said circuit through said second relay means is completed.

11. Apparatus for inspecting containers comprising a conveyor for continuously moving containers along a path, first and second carriages mounted for movement along opposite sides of the path at approximately the speed of said conveyor, means for rotating the containers about an upright axis thereof without interrupting the movement of the containers along the path, sensors supported by said first and second carriages for detecting defects in the container as the container rotates about an axis thereof, means for ejecting defective containers, and circuitry including means for storing the effect of a signal indicative of a defect in a particular container and for operating said ejecting means when the particular container arrives at the location of the ejecting means.